United States Patent [19]

Bodine

[11] Patent Number: 4,633,447

[45] Date of Patent: Dec. 30, 1986

[54] RESPONSE WAVEFORM CHARACTERIZATION OF GEOPHYSICAL DATA

[75] Inventor: John H. Bodine, Tulsa, Okla.

[73] Assignee: Amoco Corporation, Chicago, Ill.

[21] Appl. No.: 677,143

[22] Filed: Dec. 3, 1984

[51] Int. Cl.[4] .................. G01V 1/34; G06F 15/36
[52] U.S. Cl. .......................... 367/70; 367/47; 367/48; 367/110; 364/421; 340/701
[58] Field of Search .............. 367/29, 47–49, 367/70, 110; 340/701, 704; 364/421; 346/46, 33 C, 107 SC

[56] References Cited

U.S. PATENT DOCUMENTS 3,938,394  2/1976  Morrow et al. ............... 364/817
4,090,145  5/1978  Weff .............................. 328/109

OTHER PUBLICATIONS

Rao et al., "Seismic Attribute Measurements . . .," 1978, pp. 1103–1108, 10th Annu. SPE of AIME of c-3174; abst provided.
Sheriff et al, "Geologic Interpretation . . . Measurements, " 4/12/78, pp., Ann. AAPG-SaPM Mtg, Oklahoma; Abst. provided.
Robertson et al, "Thin Bed . . . Trace Attributes", 10/15/81, pp. 3635–3657. 51st Annu. Int. GBG Mtg., L.A.; S193, Abst. prov.
Sheriff et al, "Geological . . . Complex Seismic Tract," 8/77, pp. 1102–1103, Geophysics, vol. 4, #5.
Patmet et al, "Presentation of 3-D Seismic Results", 1980, 12th Annu. SPE of AIME, of C-3848, pp. 465–471; abst, prov.
Huang et al, "Detection of . . . Tree Classifiers, " 6/17/84, pp. 121–145, Geoexploration, vol. 23, #1; abst. provided.

Primary Examiner—Nelson Moskowitz
Attorney, Agent, or Firm—Timothy D. Stanley

[57] ABSTRACT

A method of processing geophysical seismic data so as to enhance its evaluation and interpretation. A plurality of response waveform characteristics are developed from a seismic signal. The response waveform characteristics can provide empirical basis for correlating a seismic signal fo formation geology and lithology. In accordance with the present invention, the response waveform characteristics are chromatically quantified and the intensity of which can be modulated so as to enhance the signal-to-noise ratio of the displayed response waveform characteristics.

24 Claims, 9 Drawing Figures

RESPONSE WAVEFORM CHARACTERIZATION OF GEOPHYSICAL DATA

BACKGROUND OF THE INVENTION

The present invention relates generally to the field of processing geophysical data so as to enhance its evaluation and interpretation in the quest for subterranean hydrocarbons. Specifically, a plurality of response waveform characteristics are generated from seismic data which can provide empirical bases for correlating the seismic data with formation geology and lithology.

In the continuing search for hydrocarbons in the earth, geophysicists have sought out new techniques to determine the effect of geology or lithology on seismic data in order to relate such effects to the occurrence of hydrocarbons. For example, Savit U.S. Pat. No. 3,662,325 discloses a method for displaying both extrinsic and intrinsic properties of subterranean formation which are generated from the seismic data. Using such displays, the geophysicists can infer the geological character of the formation and hence the probability of locating hydrocarbons. Similarly, Rice U.S. Pat. No. 4,467,461 discloses an interactive technique for color displaying selected combinations of instantaneous attributes of a seismic signal, including: amplitude, frequency, envelope, phase and velocity, in combination so as to allow an interpreter to more easily comprehend simultaneous variations of several of the instantaneous attributes and to relate these effects to geophysical occurrences of interest.

SUMMARY OF THE INVENTION

The present invention relates generally to an improved method for processing geophysical seismic data so as to enhance the evaluation and interpretation of the seismic data. The present invention processes a seismic signal to generate response waveform characteristics. The response waveform characteristics of the present invention, unlike the instantaneous attributes of Rice and Savit, uniquely describe the mean or dominant character of the seismic signal. Response waveform characteristics of the seismic signal are chromatically quantified and the intensity of which can be modulated to enhance the apparent signal-to-noise ratio of displayed response waveform characteristics. Selected response waveform characteristics generated from the seismic signal can be displayed singularly or in combination so as to assist the interpreter in detecting subtle changes in the seismic signal waveform which can provide empirical bases for correlation with formation geology and lithology.

DETAILED DESCRIPTION OF THE PREFERRED EMBODIMENT

As a prelude to a description of the present invention, the following discussion of complex seismic signal analysis is provided as an aid in understanding the present invention. A more comprehensive discussion of the application of complex signal analysis to seismic data is provided by M. T. Taner, F. Koehler, and R. E. Sheriff, in "Complex Seismic Trace Analysis" Geophysics, Volume 44, No. 6, Pages 1041-1063 (1979).

Complex signal analysis treats a seismic signal f(t) as the real portion of a complex signal s(t). The complex seismic signal s(t) is thus composed of a real signal f(t) and its corresponding Hilbert transform F(t), i.e., $$s(t) = f(t) + i \cdot F(t) \text{ where } i = \sqrt{-1} \quad (1)$$

The Hilbert transform F(t) is hereafter referred to as the quadrature of the real signal f(t).

The seismic signal f(t) can be expressed in terms of a time dependent amplitude A(t) and a time dependent phase $\theta(t)$ as:

$$f(t) = A(t) \cos \theta(t) \quad (2)$$

The quadrature F(t) can be expressed as:

$$F(t) = A(t) \sin \theta(t) \quad (3)$$

The complex signal s(t) is then:

$$s(t) = A(t)(\cos \theta(t) + i \sin \theta(t)) = A(t)e^{i\theta(t)} \quad (4)$$

The time derivative of the instantaneous phase $\theta(t)$ is referred to as the instantaneous frequency $v(t)$ and A(t) is hereinafter referred to as amplitude envelope.

Figure 1:
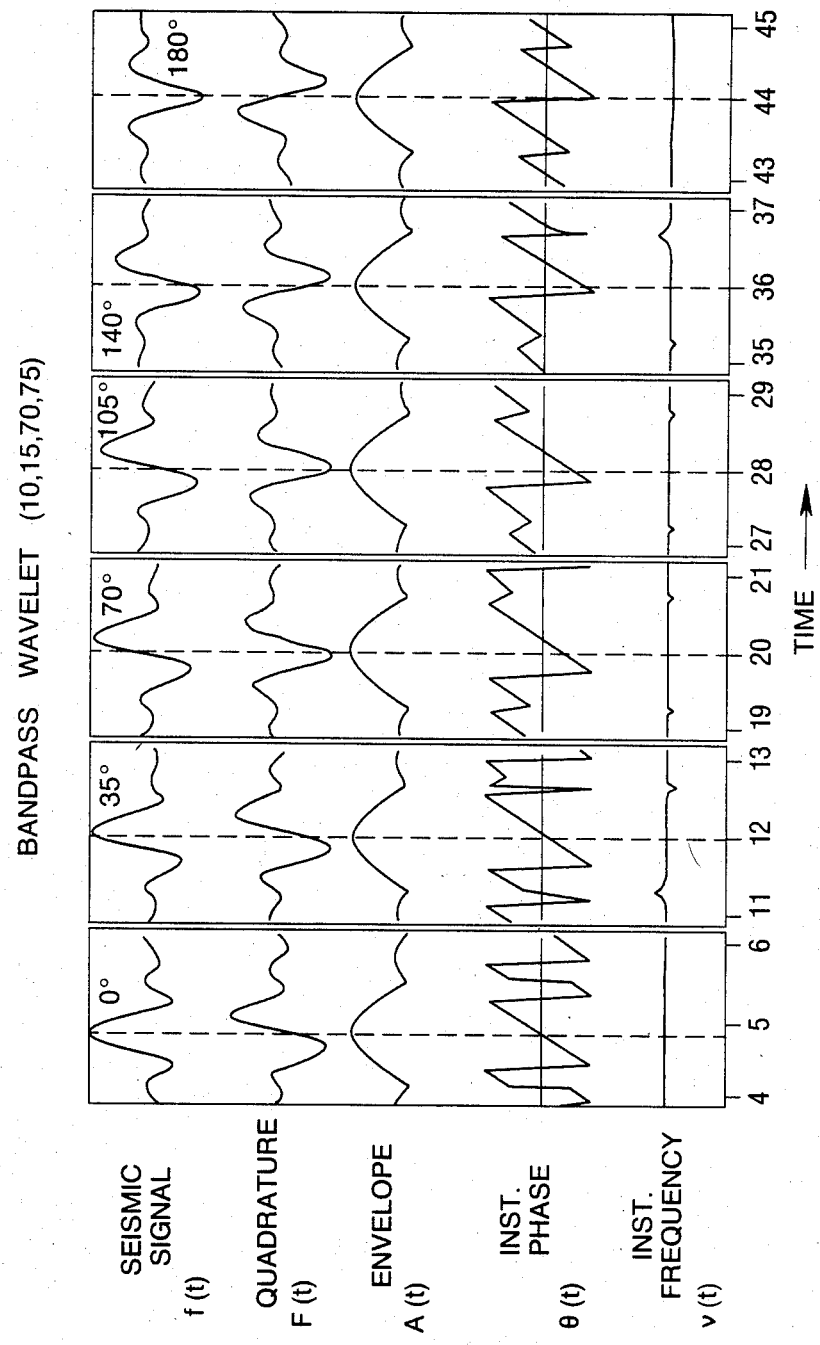
FIG. 1 is a graphical representation of the real and quadrature components of a complex seismic signal having varying phase as well as selected instantaneous attributes of the complex signal.

Looking now to FIG. 1, segments of a simulated seismic signal f(t) having varying progressive phase shifts from 0° to 180° and its corresponding quadratures F(t) are represented. Additionally, the instantaneous attributes of phase $\theta(t)$ and frequency $v(t)$, as well as the amplitude envelope A(t) are represented. It can be seen that the amplitude envelope A(t) waveform remains unchanged regardless of the phase of the seismic signal f(t). The instantaneous phase $\theta(t)$ associated with each of the predominant amplitude envelope A(t) lobe peaks, as indicated by the dashed vertical lines in FIG. 1, closely corresponds to the phase of each seismic signal f(t). Moreover, the instantaneous frequency $\nu(t)$ associated with each of the predominant amplitude envelope A(t) lobe peaks closely correspond to the mean frequency $f_m$ of the seismic signal f(t) amplitude spectrum.

Figure 2:
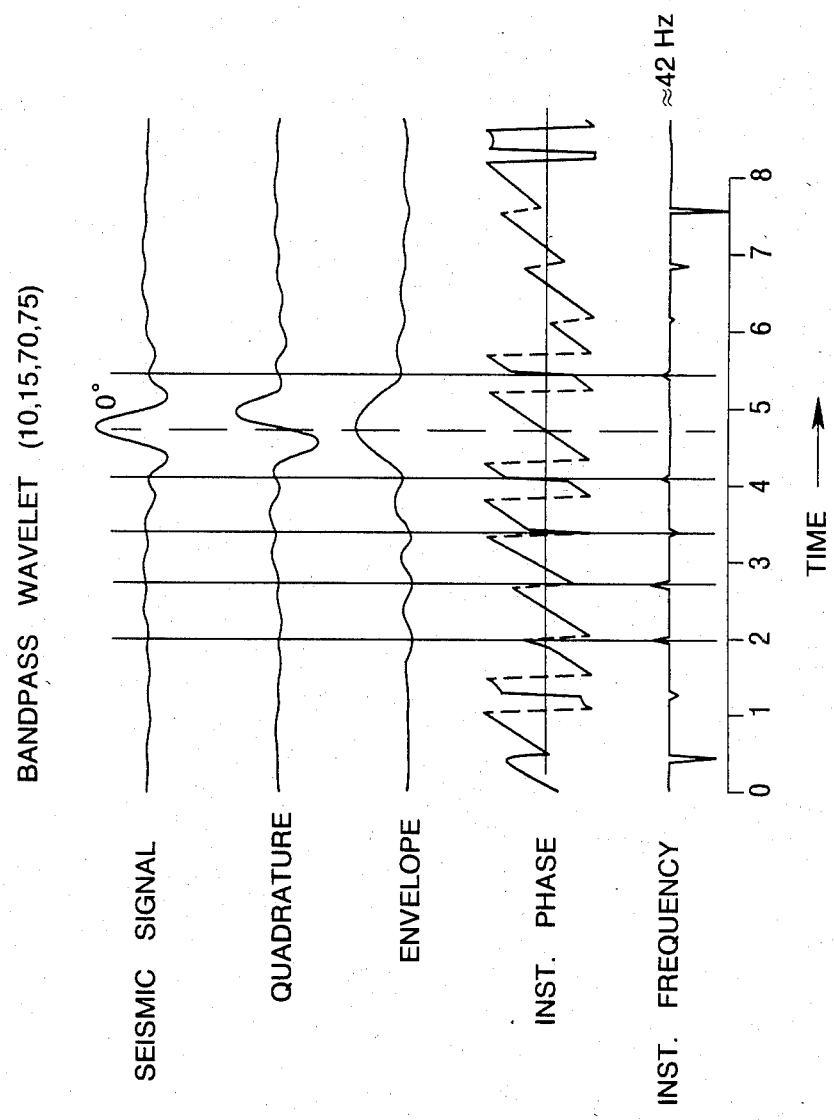
FIG. 2 is an expanded view of the zero phase seismic signal of FIG. 1.

Next, looking to FIG. 2, an expanded zero phase seismic signal f(t) of FIG. 1 and its corresponding quadrature F(t) as well as its instantaneous attributes are shown. Here, a clear indication of the cosine-sine relationship between the seismic signal f(t) and its quadrature F(t) can be seen. Moreover, it can be seen that the instantaneous frequency $\nu(t)$ (approximately 42 Hz) remains generally unchanged, indicating linear phase variation within the amplitude envelope A(t) and that the spikes in the instantaneous frequency $\nu(t)$ occur at minima in the amplitude envelope A(t) as indicated by the vertical lines. For both FIGS. 1 and 2, a bandpass wavelet (10, 15, 70, 75 Hz) has been employed to simulate the seismic signal f(t). It can be seen in both FIGS. 1 and 2 that the instantaneous phase $\theta(t)$ at the peak or maximum of the dominant amplitude envelope A(t) lobe is in agreement with the phase of the seismic signal f(t). This is a repeatable and stable observation related to the complex energy distribution of the seismic signal f(t) which can be explained by mathematical theory.

In simple terms, the most significant contribution to signal energy are found in the vicinity of the predominant amplitude envelope A(t) lobe peaks or stationary points. Thus, with a degree of uncertainty dependent upon the seismic signal f(t) bandwidth and time duration, one can measure the mean or dominant properties of the seismic signal f(t) waveform within the predominant amplitude envelope A(t) lobe using the instantaneous attributes in the vicinity of the position of peak energy. The instantaneous phase $\theta(t)$ tends to become linear about the predominant amplitude envelope A(t) peak (i.e., the stationary point) and the instantaneous frequency $\nu(t)$ tend towards the mean frequency $f_m$ of the spectral energy distribution. With selective extraction of the instantaneous attributes at the predominant amplitude envelope A(t) lobe peaks, one can characterize the seismic signal f(t) waveform for each amplitude envelope A(t) lobe and group arrival. Thus, means for quickly and accurately quantifying the seismic signal f(t) waveform as a function of time are provided.

Hereafter, the instantaneous phase $\theta(t)$ and frequency $\nu(t)$ at each amplitude envelope A(t) lobe peak are designated the response phase $\bar{\theta}$ and response frequency $\bar{\nu}$, respectively.

Figure 3:
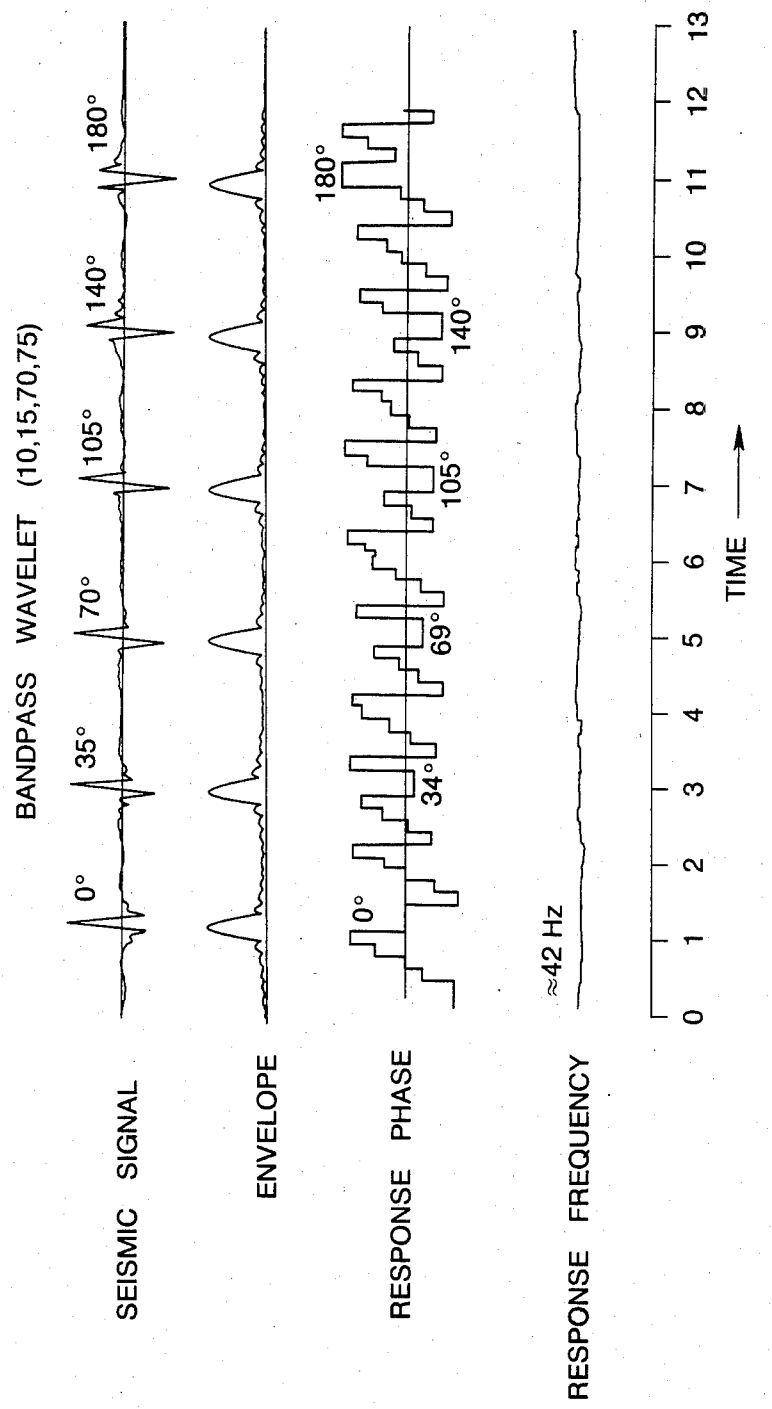
FIG. 3 is a graphical representation of the real and quadrature components of a complex seismic signal having varying phase as well as selected response waveform characteristics of the complex seismic signal.

Looking to FIG. 3, the seismic signals f(t) from FIG. 1 are represented along with their associated response phase $\bar{\theta}$, response frequency $\bar{\nu}$, and amplitude envelope A(t). In particular, the response phase $\bar{\theta}$ and response frequency $\bar{\nu}$ are represented as having a constant value from trough-to-trough about each amplitude envelope A(t) lobe peak. This trough-to-trough measure about an amplitude envelope A(t) lobe peak is referred to as the width of the envelope.

Figure 4:
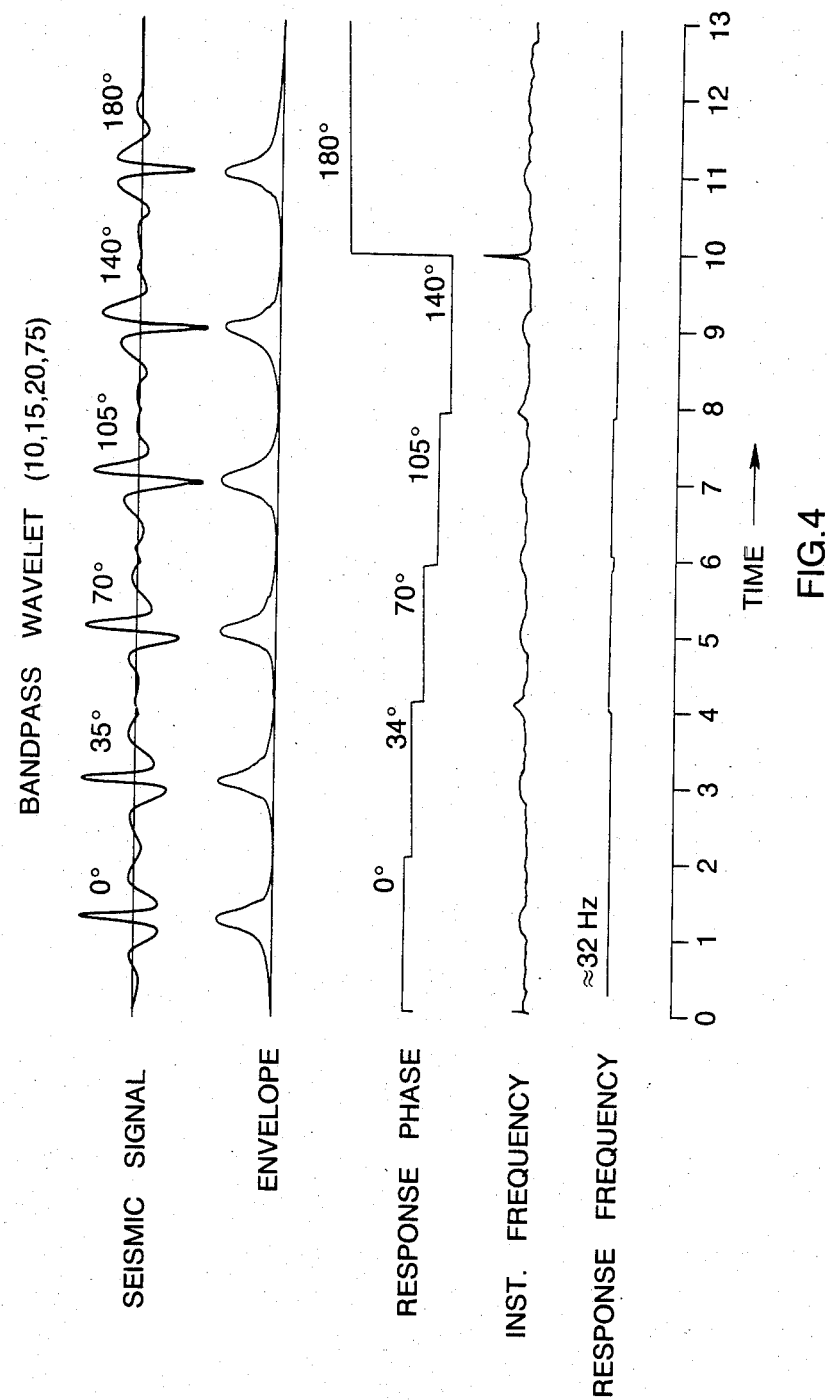
FIG. 4 is a graphical representation of real and quadrature components of a complex seismic signal having both varying phase as well as selected response waveform characteristics of the complex seismic signal.

Recall that in FIGS. 1-3 a bandpass wavelet (10, 15, 65, 70 Hz) was used to simulate the seismic signal f(t). Looking now to FIG. 4, a bandpass wavelet (10, 15, 20, 70 Hz) having an amplitude spectrum tapered on the high end of the frequency band is employed. The main difference between FIG. 1 and FIG. 4 is the low frequency side lobes of the latter seismic signal f(t) and the smoother appearance of its amplitude envelope A(t). Also shown in FIG. 4 are the response phase $\bar{\theta}$ and response frequency $\bar{\nu}$ for a series of seismic signals f(t), each having an incremental phase shift from 0° to 180°. In FIG. 4, the amplitude envelope A(t) waveform is identical for each seismic signal f(t) regardless of its phase. The response phase $\bar{\theta}$ closely tracks the phase change from seismic signal to seismic signal and the response frequency $\bar{\nu}$ accurately measures the mean frequency $f_m$ of the seismic signal f(t), i.e., approximately 32 Hz. Even though the instantaneous frequency $\nu(t)$ is no longer constant, but is peaked in the vicinity of the predominant amplitude envelope A(t) lobe peak, the response frequency $\bar{\nu}$ remains relatively constant and still closely approximates the mean frequency $f_m$ of the amplitude spectrum of the seismic signal f(t). This results since the response frequency $\bar{\nu}$ is determined only at the point of the amplitude envelope A(t) lobe peak or maxima.

Figure 5:
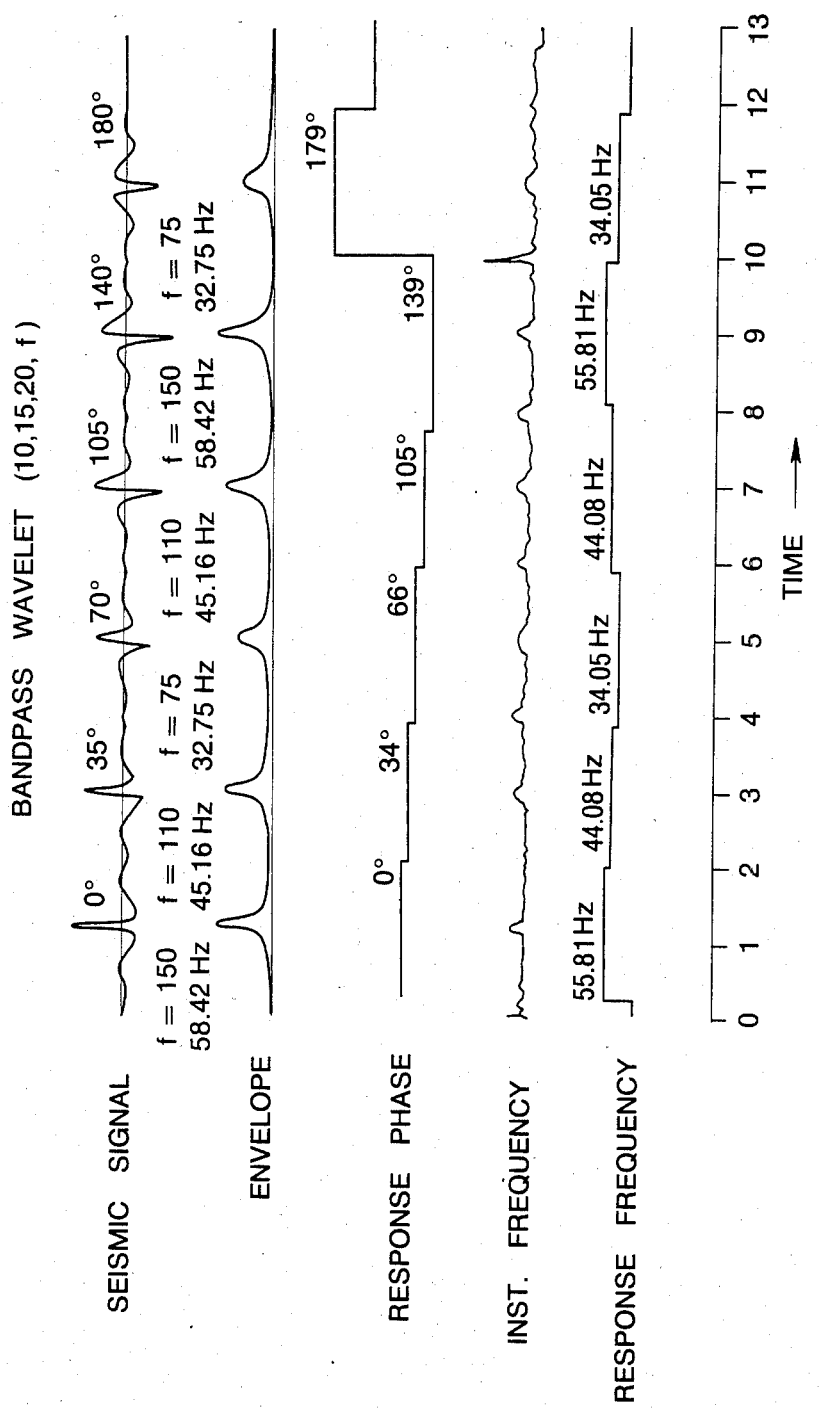
FIG. 5 is a graphical representation of the real and quadrature components of a complex seismic signal having varying phase and frequency content as well as response waveform characteristics of the complex seismic signal.

In FIG. 5 not only does the phase of each seismic signal f(t) vary, but its frequency content as well. Each seismic signal f(t) is shown with its upper bandpass frequency f and its mean frequency $f_m$. Here it is seen that response frequency $\bar{\nu}$ closely tracks the change in the mean frequency $f_m$ from wavelet-to-wavelet even though the instantaneous frequency $\nu(t)$ has significant variability in amplitude and periodicity.

Figure 6:
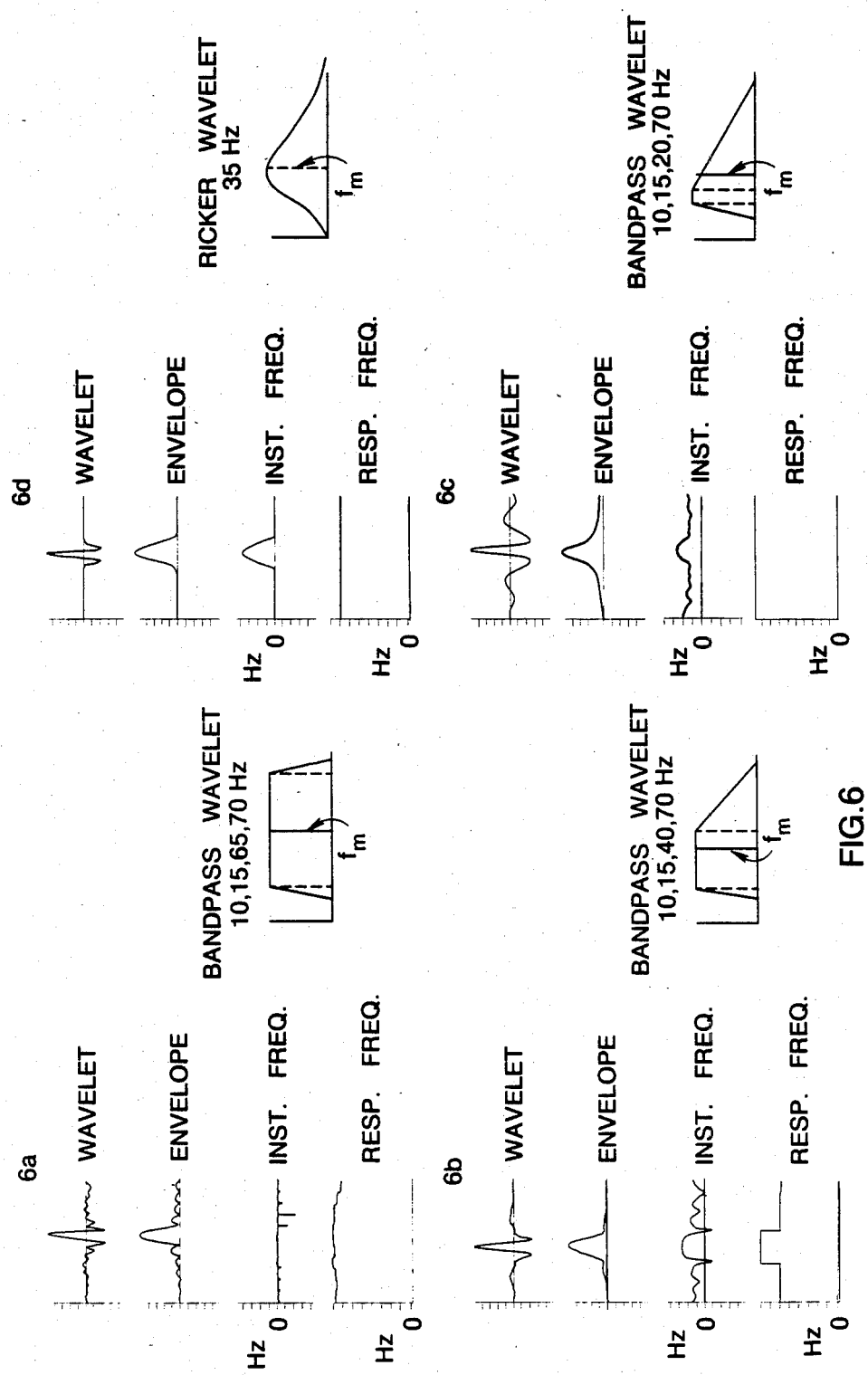
FIGS. 6a-c are a series of bandpass wavelets and their derived response waveform characteristics compared to FIG. 6d, a Ricker wavelet and its response waveform characteristics.

In order that one may more clearly understand the relationship of instantaneous frequency $\nu(t)$ to the bandpass of the seismic signal f(t), FIGS. 6a-c are provided with a series of bandpass wavelets differing in the degree of taper on the upper part of the frequency band and its associated amplitude envelope A(t), instantaneous frequency $\nu(t)$ and response frequency $\bar{\nu}$. The bandpass wavelets of FIGS. 6a-c are compared to a 35 Hz Ricker wavelet in FIG. 6d. It should be noted that the instantaneous frequency $\nu(t)$ is nearly flat for the bandpass wavelet in FIG. 6a, but tends to develop some shaping as a tapering of the high frequency content increases in FIGS. 6b and 6c. It is also noted that as the tapering increases, the side lobes of the amplitude envelope A(t) diminish approaching the smoothness of the Ricker wavelet in FIG. 6d. The bandpass wavelet with greatest tapering, FIG. 6c, has relatively low frequency side lobes. This is consistent with the variations of the instantaneous frequency $\nu(t)$ which measures the mean frequency $f_m$ as a function of time.

Figure 7:
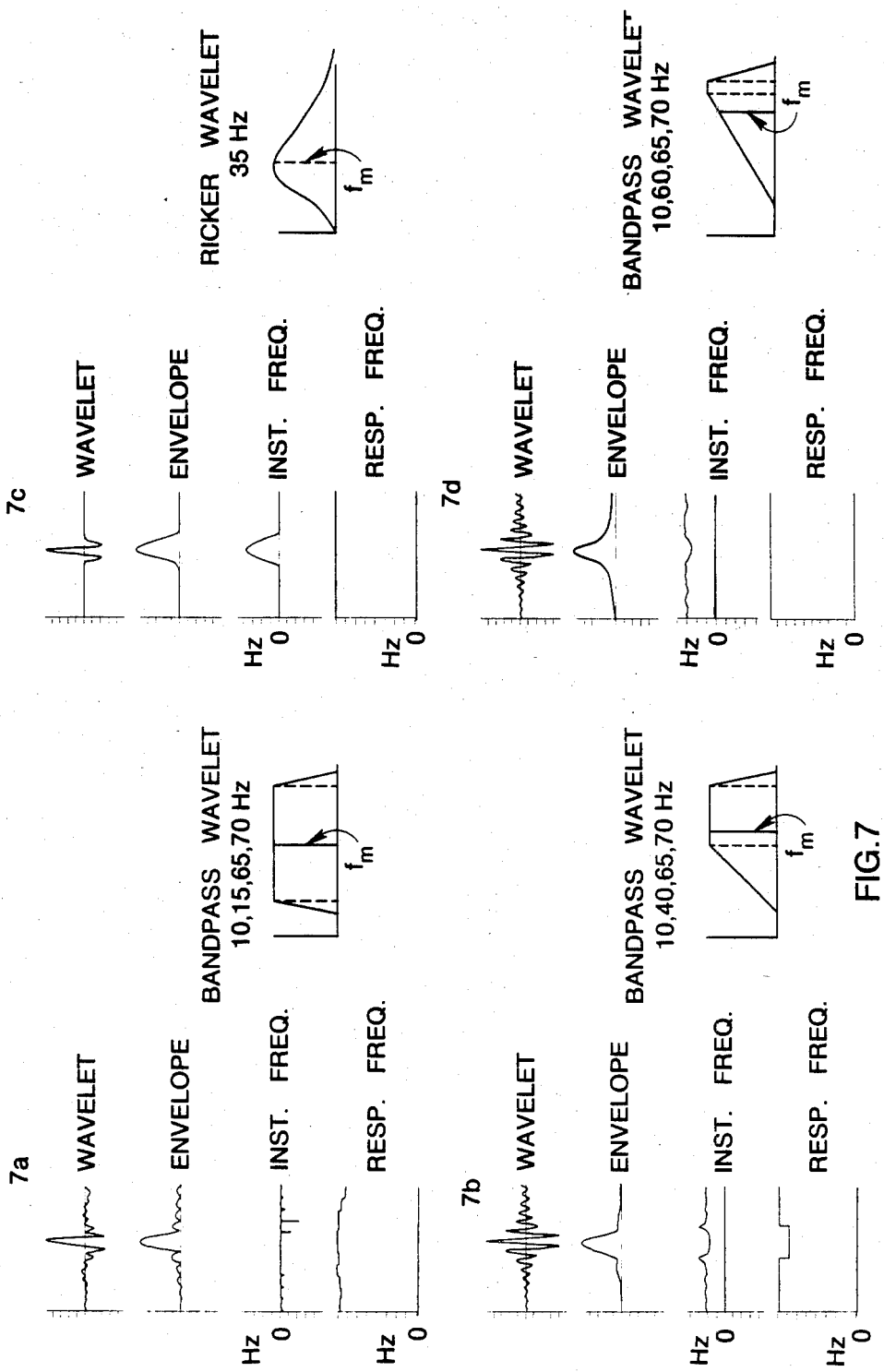
FIGS. 7a-c are a series of bandpass wavelets and their derived response waveform characteristics compared to FIG. 7d, a Ricker wavelet and its response waveform attributes.

Next, looking at FIGS. 7a-c, the effect of varying the low frequency end of a bandpass wavelet is shown. Here, the inverse effects appear to those displayed in FIGS. 6a-c. Spikes in the instantaneous frequency $\nu(t)$ are associated with local minima in the amplitude envelope A(t) while the high frequency side lobes of the wavelet are consistent with the elevated instantaneous frequency $\nu(t)$ values in those zones.

Having examined the effectiveness of the response phase $\bar{\theta}$ and response frequency $\bar{\nu}$ to characterize both a smooth wavelet and tapered bandpass wavelets, we now return to the original full bandpass wavelet of FIG. 3 with all of its side lobes. Recall that one first determines both the local maxima and minima in the amplitude envelope A(t) and then determines the value of each instantaneous attribute associated with the local maxima to define response waveform characteristics. Each response waveform characteristics can then be displayed as a constant across the respective envelope width, i.e, trough-to-trough about the amplitude envelope A(t) maxima. Thus, looking at FIG. 3, the response phase $\bar{\theta}$ is quite broken and choppy while the response frequency $\bar{\nu}$ is quite segmented in appearance. However, at the position of the predominant amplitude envelope A(t) lobe peak or maxima, the response phase $\bar{\theta}$ accurately measures the phase of the seismic signal f(t). The bandpass is constant for all wavelets so that response frequency $\bar{\nu}$ measures only one constant mean frequency $f_m$, while in FIG. 5, the response frequency $\bar{\nu}$ accurately tracks changes in the mean frequency $f_m$ of the seismic signal f(t).

Since it is the value of the response waveform characteristics at the predominant amplitude envelope A(t) lobe peak which effectively characterize the mean or dominant properties of the seismic signal f(t) waveform, it is desirable to emphasize the response phase $\bar{\theta}$ and response frequency $\bar{\nu}$ measurements at the highest signal-to-noise portions of the seismic f(t), i.e., the high or predominant amplitude envelope lobes at the expense of the lower amplitude envelope side lobes. A preferred method to achieve this result is to chromatically quantify the response waveform characteristics, i.e., employ a spectrum of colors to represent gradations in magnitude of the response waveform characteristics and thereafter to modulate the color intensity or area according to the seismic signal f(t) amplitude.

Figure 8A:
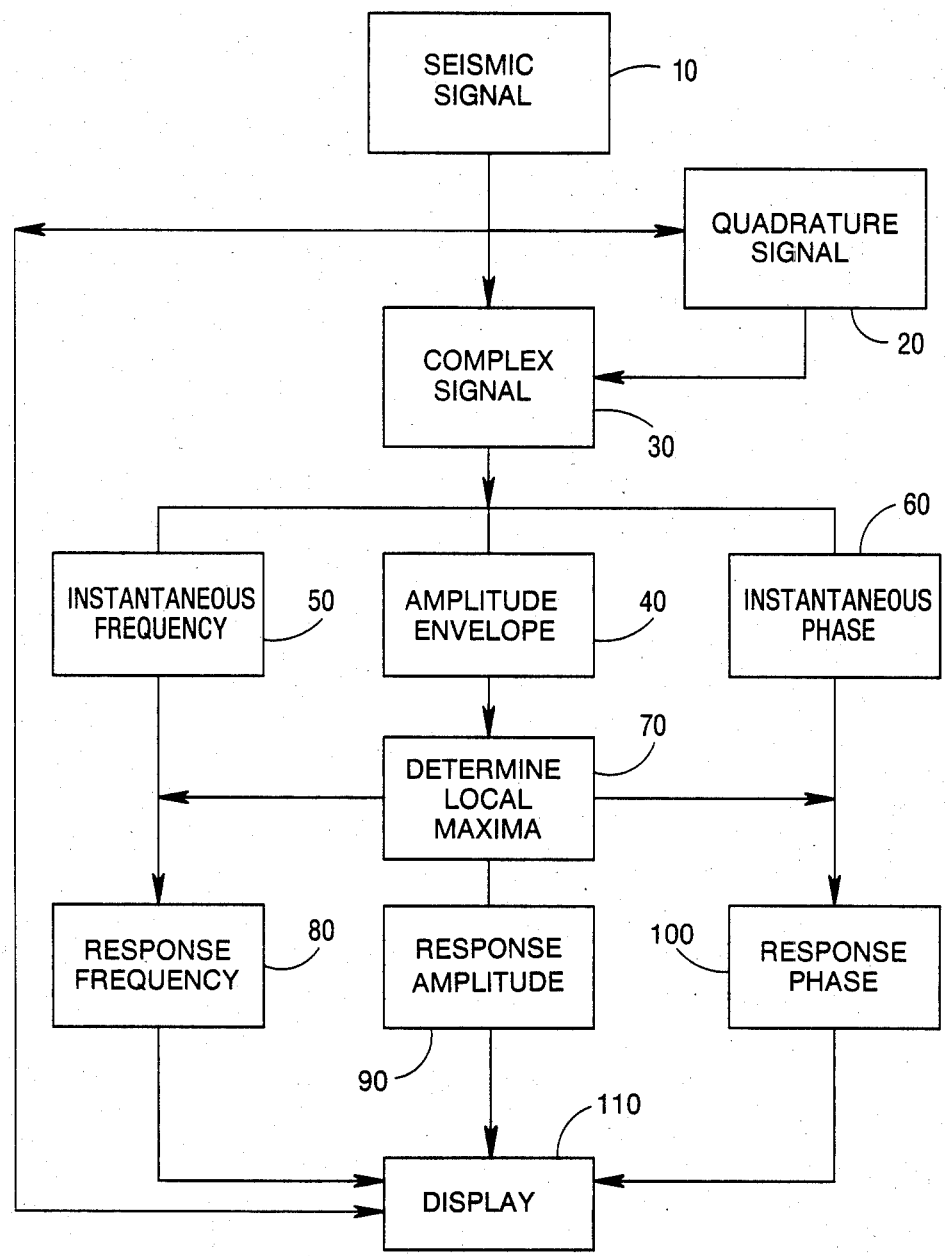
FIGS. 8a-b are block diagrams of the process of the present invention.

Looking now to FIG. 8a, a block diagram of the process of the present invention is depicted. Seismic data, including a plurality of seismic signals f(t) are collected on a magnetic tape 10 or the like. Hilbert transforms F(t) of the seismic signals f(t) are generated at 20. A complex seismic signal s(t) is formed at 30 from the seismic signals f(t) and the Hilbert transform F(t). An amplitude envelope A(t) of the complex signal s(t) is generated at 40 and the instantaneous frequency $\nu$(t) and the instantaneous phase $\theta$(t) of the complex signal s(t) are generated at 50 and 60, respectively. At 70, local maxima or peaks and local minima in the amplitude envelope A(t) are identified and the instantaneous frequency $\nu$(t) and instantaneous phase $\theta$(t) associated with such local maxima or peak in the amplitude envelope A(t) are determined at 80 and 100, respectively, and hereinafter designated as response waveform characteristics of the seismic signal, i.e., response frequency $\bar{\nu}$ and response phase $\bar{\theta}$.

A measure of the amplitude envelope A(t) at each maxima or peak is designated the response amplitude $\bar{A}$ and is obtained at 90 and is also included within the definition of a response waveform characteristic. A measure of the response phase $\bar{\theta}$, response frequency $\bar{\nu}$ and response amplitude $\bar{A}$ so determined for each local maxima can be displayed as constants across the amplitude width i.e., trough-to-trough about local peaks of the amplitude envelope A(t) as seen in FIGS. 1-5. Thereafter, the response waveform characteristics can be displayed either singularly or in combination at 110. It is also advantageous to overlay the seismic signal f(t) wiggle trace over the response waveform characteristics.

Figure 8B:
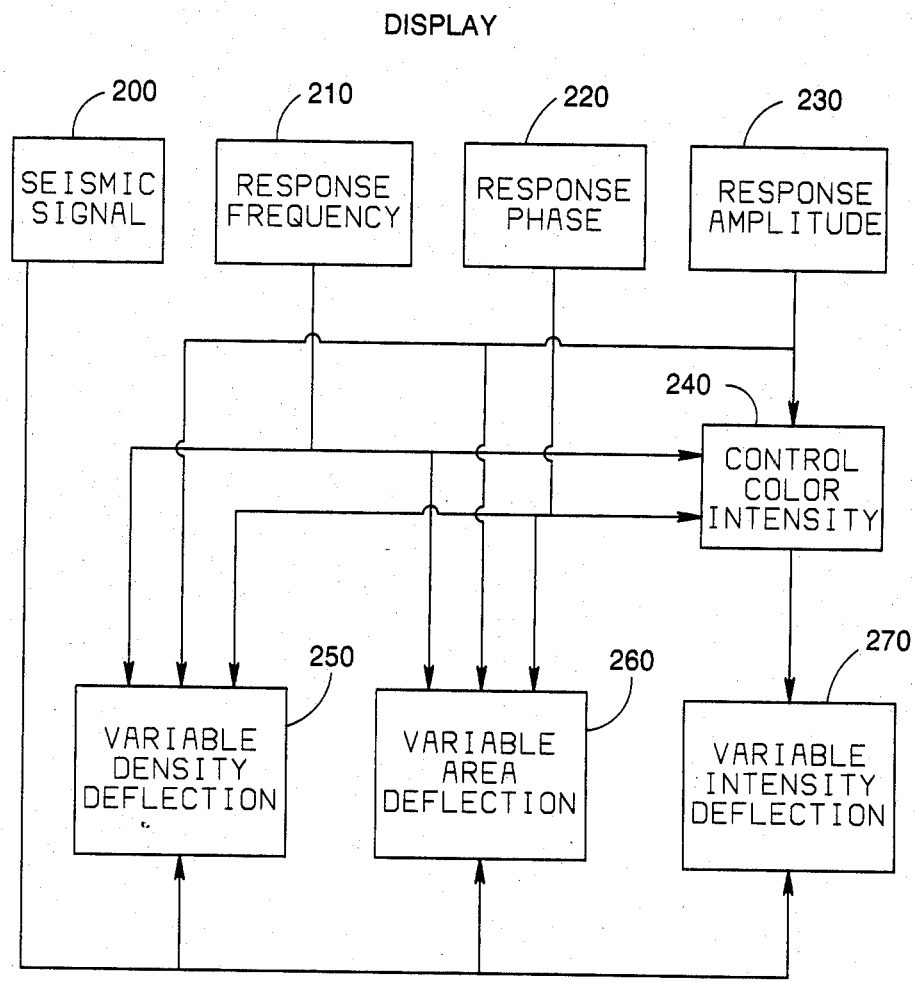

As an aid in displaying the response frequency $\bar{\nu}$, response phase $\bar{\theta}$, and response amplitude $\bar{A}$, each are chromatically quantified. That is, looking to FIG. 8b, colors are assigned corresponding to a selected band of frequencies (e.g., 0 to 90 Hz) at 210, a band of phase angles (e.g., −180° to +180°) at 220, and normalized amplitudes at 230. Alternatively, separate colors can be assigned to each response waveform characteristic having a prescribed minimum or maximum value. Thus, when displayed in combination, chromatic vector addition can indicate various combinations of the response waveform characteristics concurrently. The response waveform characteristics can be displayed either singularly or in combination with an overlayed seismic signal f(t) variable area wiggle trace from 200 in one of three seismic section formats.

Specifically, a variable density deflection VDD with a full intensity colored background and a black wiggle overlay is produced at 250 as shown later in FIGS. 11-13. A variable area deflection VAD with a white background and full intensity color within the seismic signal f(t) wiggle lobe areas is produced at 260 as shown later in FIG. 10. Additionally, a variable intensity deflection VID with a variable intensity color background and black wiggle overlay is produced at 270. The color intensity of the response waveform characteristic is modulated at 240 using the amplitude of the corresponding seismic signal f(t). By modulating the color intensity in the VID or the amount of color in the VAD techniques, a higher apparent signal-to-noise ratio can be achieved by suppressing the response frequency $\bar{\nu}$, response phase $\bar{\theta}$, and response amplitude $\bar{A}$ associated with low amplitude envelope events, i.e., with other than the predominant lobe of the amplitude envelope A(t), which could be comprised primarily of noise.

Figure 9:
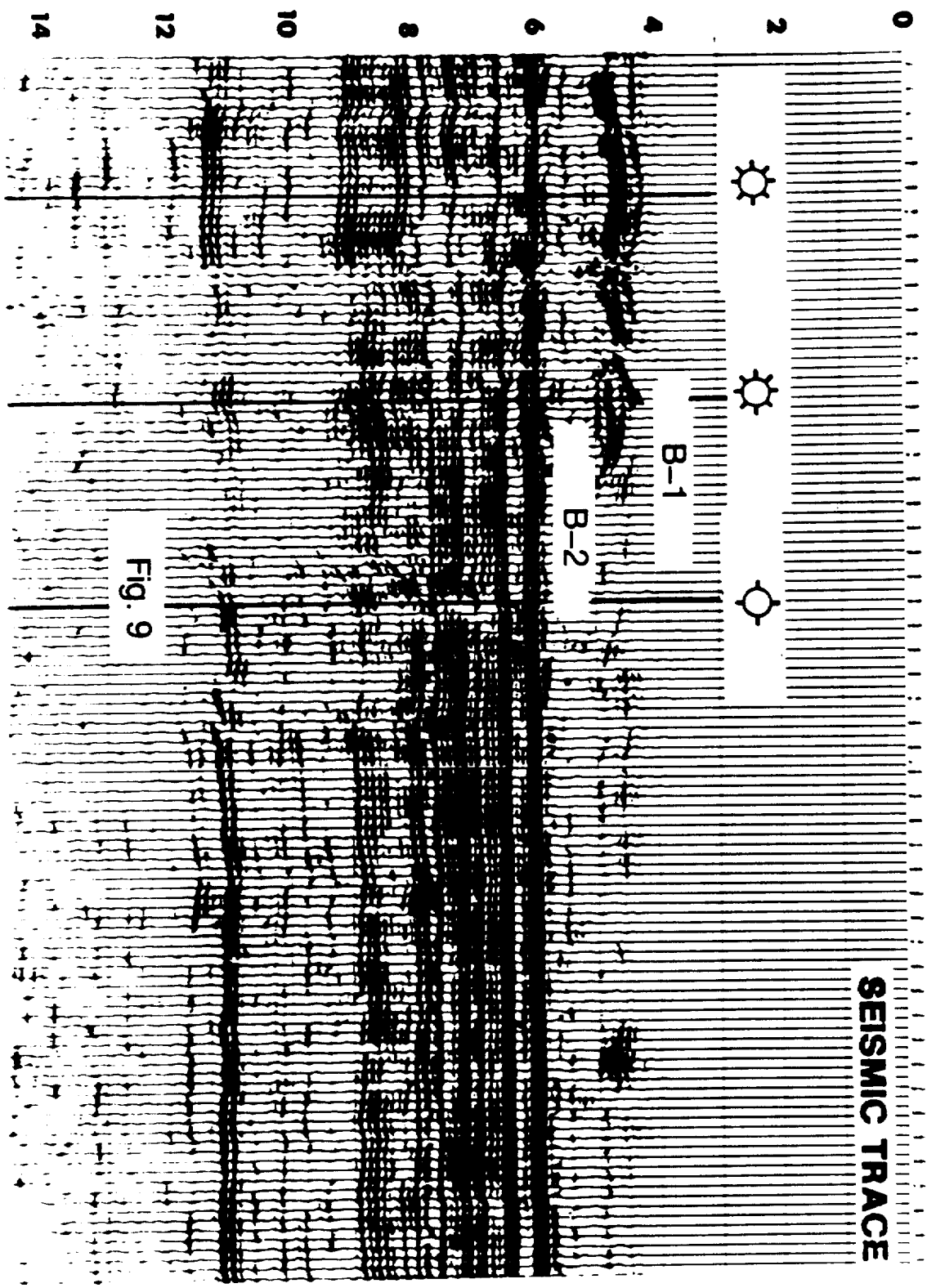
FIG. 9 is a color plot of a seismic section with seismic signals overlayed thereon.

Looking first to FIG. 9, a colored seismic section across a high amplitude reflection is shown. Blue, green, yellow and red are positive amplitudes while brown, gray, and orange are negative values of seismic signal f(t) amplitudes. Two reflectors, B-1 and B-2 are indicated by the arrows, and both are relatively shallow events which are clearly defined as high amplitude events. Moreover, in this section, only every third wiggle trace of the seismic signal f(t) has been superimposed on the section.

Figure 10:
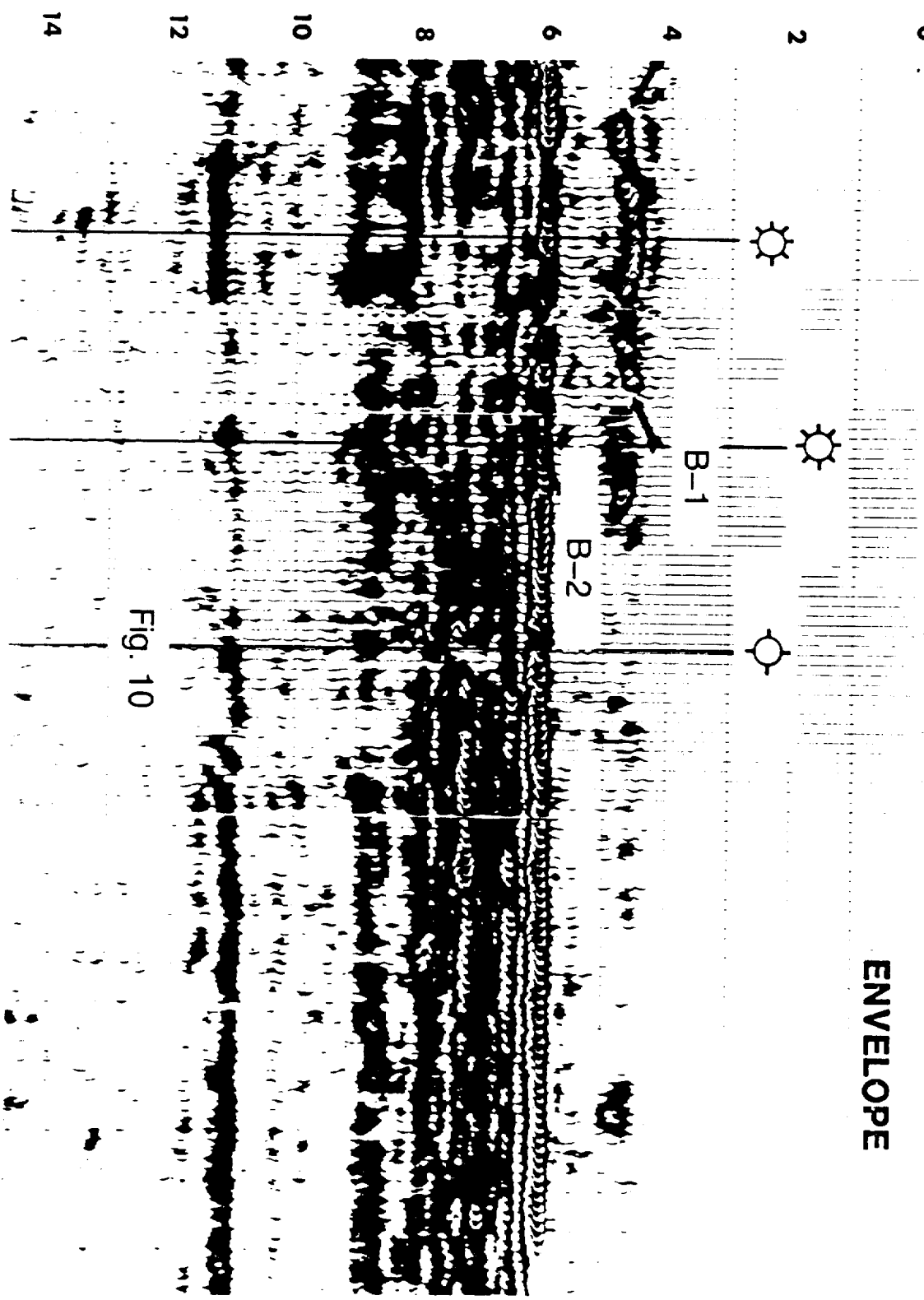
FIG. 10 is a color plot of seismic signal envelope with the seismic signals overlayed thereon.

The amplitude envelope A(t) derived from the seismic signals of FIG. 9 is shown in FIG. 10. The reflectors B-1 and B-2 are clearly seen in this section. The envelope section highlights regions of high reflection strength.

Figure 11:
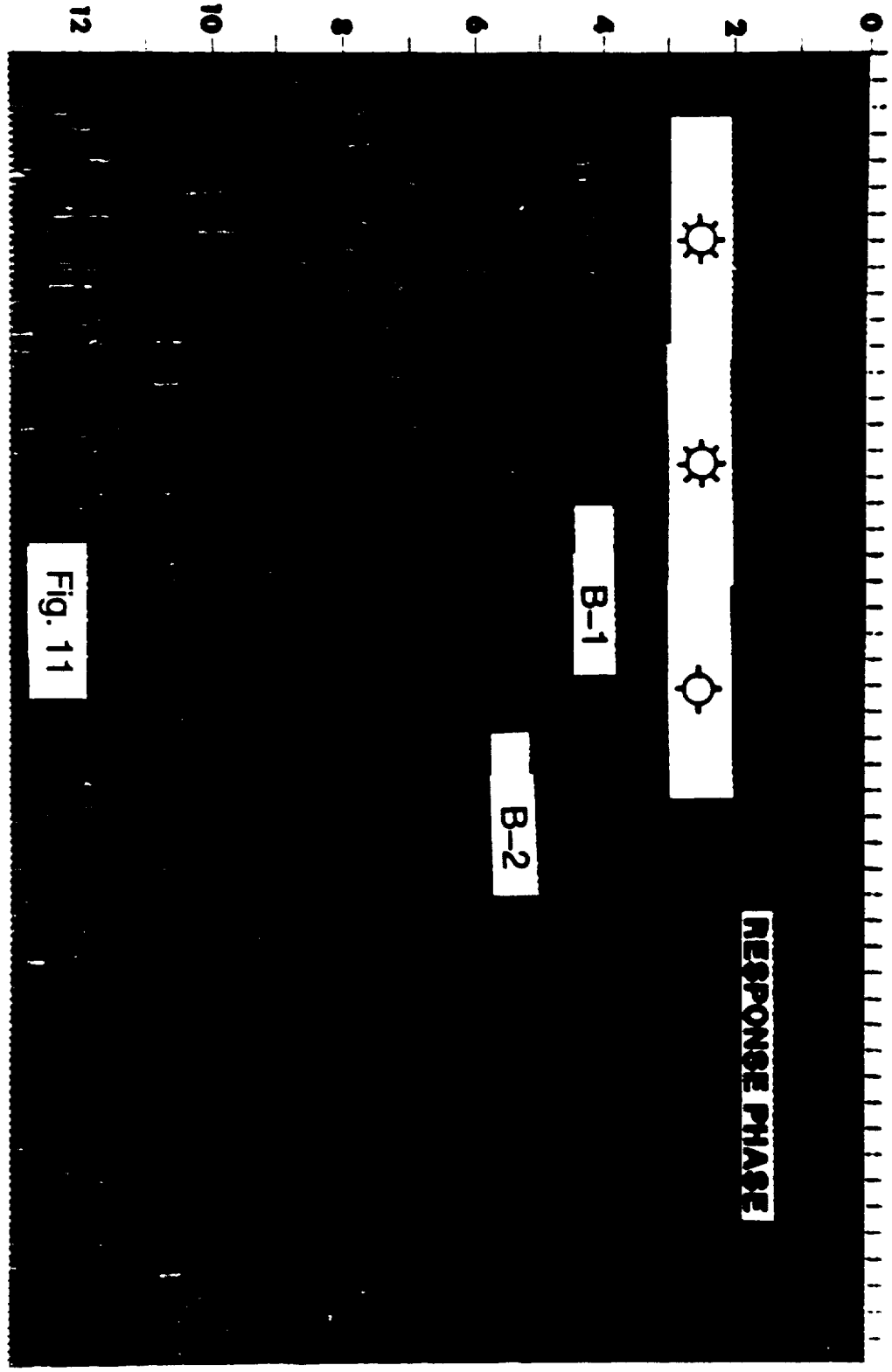
FIGS. 11-13 are color plots of response waveform characteristics with the seismic signals overlayed thereon.

The response phase $\bar{\theta}$ derived from the seismic signals of FIG. 9 is shown in FIG. 11. The color scale ranges from purple (−180°) through blue (−120°), green (−60°), to yellow (0°), then through orange (+60°), red (+120°), and again to purple (+180°). These are several important features to note in this section. First, while all response phase $\bar{\theta}$ estimates have equal color intensity in this plot, one can clearly see the uniform continuity of the phase reflected from reflector B-2. It measures approximately −100°. The reflector B-1 response phase it somewhat more variable, partly due to faulting in these horizons, but in general, is of opposite polarity, approximately 70°-90°. In areas of low signal-to-noise ratio of the seismic signal, the colors appear more mosaic-like or less coherent.

The nonproductive reflector B-2 in FIG. 11 is noticeably different from the productive reflector B-1. Upon closer inspection of the seismic signal waveforms of the two reflectors, one can see that they are different, but the contrast is not readily apparent before seeing the color displays. One end of the nonproductive reflector B-2 does not contrast as much, but is still significantly different having approximately a −20° response phase $\bar{\theta}$ compared to 60°-90° response phase $\bar{\theta}$ at the other end. It is also noted that as response phase $\bar{\theta}$ undergoes a slight shift for reflector B-2 of about 45°, that is, from blue green to yellow green, this shift can be associated with effects of gas in a chalk formation.

Besides absorptive effects in which high frequencies are preferentially attenuated, a large absorption coefficient can produce a phase shift in seismic reflection and transmitted waves. Most clear cut at present, however, is the discrimination between productive and non-productive reflectors. Looking next to FIG. 12, the response phase $\bar{\theta}$ which has been modulated by the seismic signal f(t) amplitudes. This is done by coloring the variable area lobe of the seismic trace with the color of the respective response phase $\bar{\theta}$.

Figure 12:
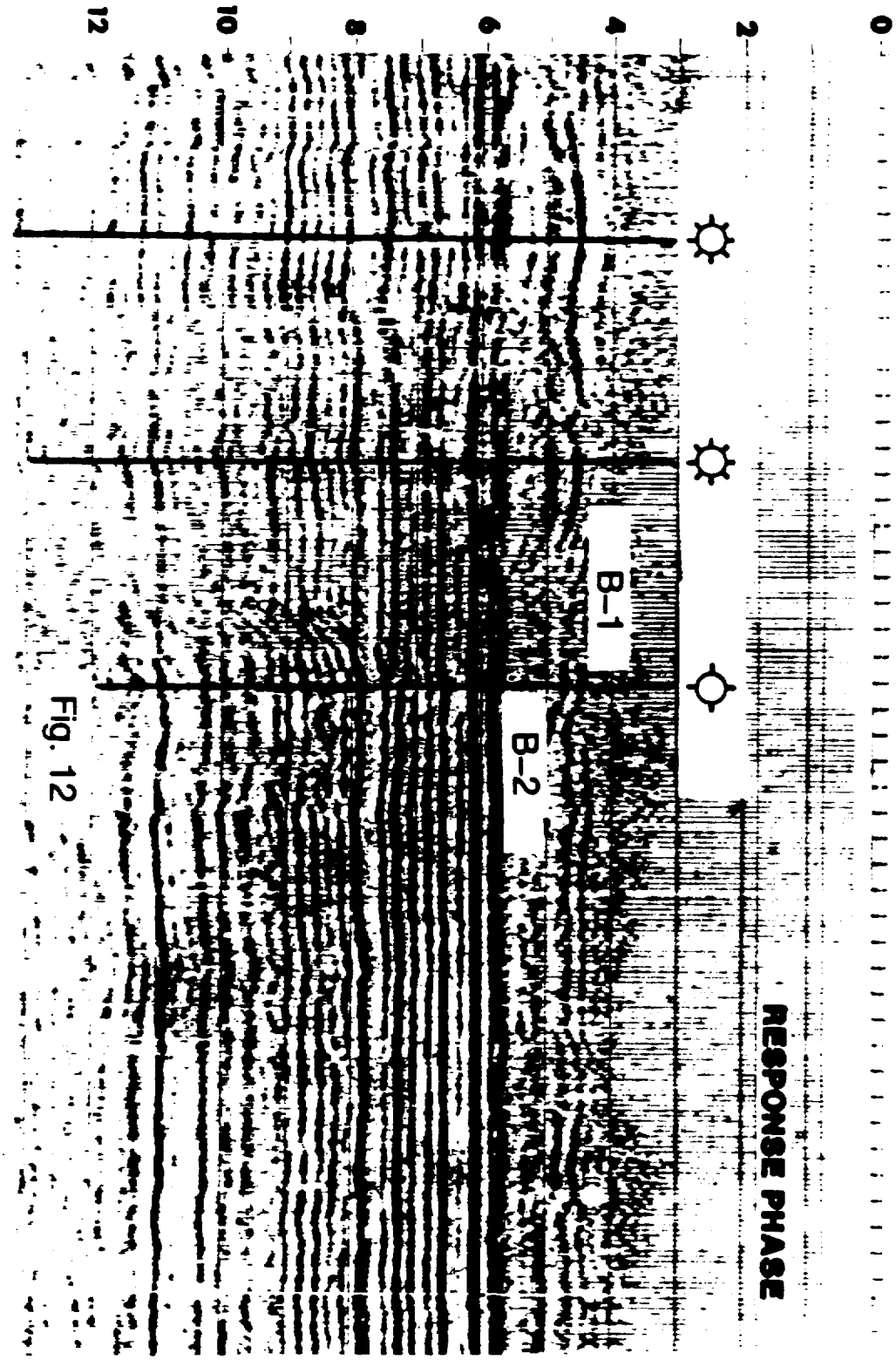
Figure 13:
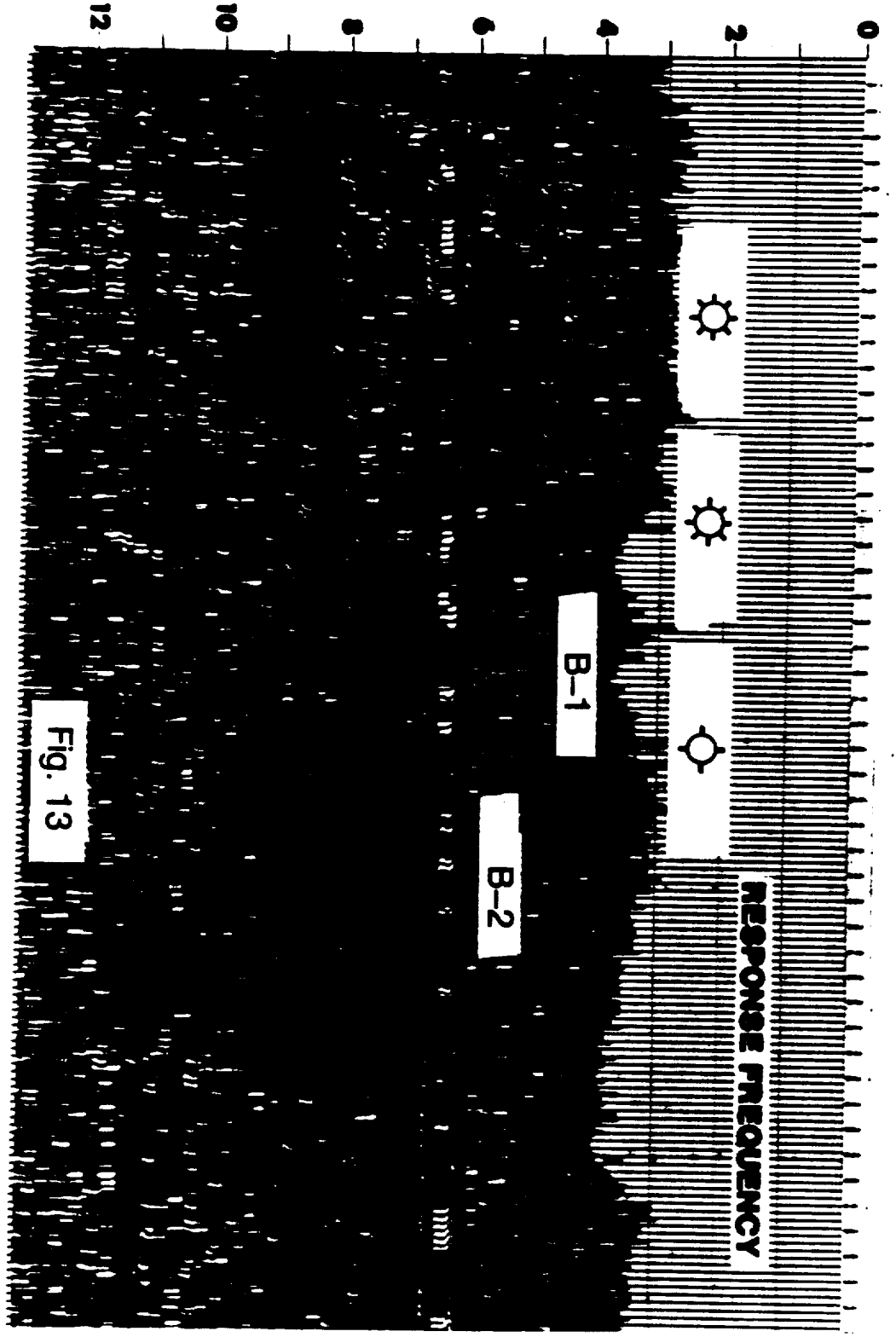

Next looking at FIG. 13, the response frequency $\nu$ in FIG. 12, the color scales range from white at 0 Hz through red, orange, yellow, green, blue, up to 90 Hz. The mean frequency for this bandpass is approximately 30 Hz. It is noted that the reflector B-1 response frequency $\bar{\nu}$ is a relatively low frequency event with respect to the nonproductive reflector B-2 and most of the other major reflectors. The productive reflector B-1 is also associated with an underlying low response frequency anomaly. This is consistent with empirical results reported in the literature for analysis of gas zones using instantaneous attributes.

It is important to note the response phase $\bar{\theta}$ and response frequency $\bar{\nu}$ require excellent preprocessing to minimize noise effects and stabilize the stack trace waveform. The ability to quantify response waveform characteristics from seismic data is the main advantage of using complex seismic signal analysis. This is a principle upon which pattern recognition technology depends and which may be extended to more complicated computerized applications. With several elemental characteristics of a signal, for example, phase frequency, pulse direction, amplitude, etc., one can uniquely characterize segments of seismic data and subject them to statistical analysis and correlation.

The foregoing describes a novel method for deriving waveform characteristics for waveform analysis of geophysical data. The analysis technique provides a method whereby an operator can obtain quantitative measures of the seismic signal and derive empirical relations between the seismic signal and the subterranean formation to assist in determination of the formation geology and lithology. Changes may be made in combination and arrangement of the steps heretofore set forth in the specification and shown in the drawing; it being understood that changes may be made without departing from the spirit and scope of the invention as defined in the following claims.

What I claim is:

1. A method of processing seismic signals for empirical interpretation comprising steps of:
   (a) forming a complex signal from a selected portion of the seismic signals;
   (b) locating maxima in the amplitude envelope of the complex signals;
   (c) determining a measure of at least one instantaneous attribute of the complex signal for each corresponding maxima in the amplitude envelope; and
   (d) displaying the measure of at least one instantaneous attribute as a constant across the envelope width of the amplitude envelope.

2. The method of claim 1 wherein step (c) includes: determining a measure of the instantaneous frequency attribute for each corresponding maxima in the amplitude envelope.

3. The method of claim 1 wherein step (c) includes: determining a measure of the instantaneous phase attribute for each corresponding maxima in the amplitude envelope.

4. The method of claim 1 further including the step of chromatically quantifying the measure of the instantaneous attribute.

5. The method of claim 4 further including the step of modulating the intensity of the chromatically quantified instantaneous attribute.

6. A method for characterizing seismic data to enhance its evaluation and interpretation, comprising the steps of:
   (a) producing a first instantaneous attribute representative of a seismic signal of the seismic data;
   (b) producing a second instantaneous attribute representative of the seismic signal; and
   (c) producing a response waveform characteristic from the first and second instantaneous attributes, wherein the response waveform characteristic comprises a selected measure of the second instantaneous attribute for a corresponding selected measure of the first instantaneous attribute and the response waveform characteristic provides a measure of a dominant characteristic of the seismic signal.

7. The method of claim 6 wherein step (c) comprises:
   (a) locating maxima in the first instantaneous attribute; and
   (b) producing response waveform characteristics from measures of the second instantaneous attribute corresponding to maxima in the first instantaneous attribute.

8. The method of claim 7 further including the steps of:
   (a) locating minima in the first instantaneous attribute; and
   (b) characterizing a dominant characteristic of the seismic signal by setting the response waveform characteristics constant from minima to minima about each respective maxima.

9. The method of claim 6 further including the steps of:
   (a) producing at least two response waveform characteristics from at least two or more instantaneous attributes of the seismic signals;
   (b) assigning separate colors to each response waveform characteristic and modulating the intensity thereof with a measure of the seismic signal; and
   (c) combining the separately colored and modulated response waveform characteristic by chromatic vector addition.

10. The method of claim 1 further including the steps of:
    (a) assigning separate colors to each response waveform characteristic; and
    (b) modulating the intensity of the colored response waveform characteristics with a measure of the seismic signal to enhance a dominant characteristic of the seismic signal.

11. The method of claim 10 further including the step of:
    (a) combining the separately colored and modulated colored response waveform characteristics by chromatic vector addition to locate predetermined combinations of response waveform characteristics.

12. The method of claim 8 further including the step of:

displaying a measure of the response waveform form characteristics.

13. The method of claim 6 wherein the step of producing a first instantaneous attribute includes:
producing an instantaneous amplitude envelope attribute representation of the seismic signal.

14. The method of claim 13 wherein the step of producing a second instantaneous attribute includes:
producing an instantaneous frequency attribute representation of the seismic signal.

15. The method of claim 13 wherein the step of producing a second instantaneous attribute includes:
producing an instantaneous phase attribute representation of the seismic signal.

16. The method of claim 14 wherein the step of producing response waveform characteristics includes:
determining a measure of the instantaneous frequency attribute at corresponding local maxima in the instantaneous amplitude envelope attribute.

17. The method of claim 16 further including the step of:
displaying a measure of the response waveform characteristics superimposed on a representation of the seismic signal.

18. The method of claim 15 wherein the step of producing response waveform characteristics includes:
determining a measure of the instantaneous phase attribute at corresponding local maxima in the instantaneous amplitude envelope attribute.

19. The method of claim 18 further including the step of:
displaying a measure of the response waveform characteristics superimposed on a representation of the seismic signal.

20. The method of claim 6 further including chromatically quantifying the response waveform characteristics.

21. The method of claim 20 further including modulating the intensity of the chromatically quantified response waveform characteristics.

22. The method of claim 13 wherein the first and second instantaneous attributes representative of the seismic signal are the instantaneous amplitude envelope attribute.

23. The method of claim 22 further including the step of:
determining a measure of the instantaneous amplitude envelope attribute at local maxima in the instantaneous amplitude envelope attribute.

24. The method of claim 23 further including the step of:
displaying a measure of the response waveform characteristics superimposed on a representation of seismic signal.

* * * * *

UNITED STATES PATENT OFFICE
CERTIFICATE OF CORRECTION

PATENT NO. : 4,633,447
DATED : December 30, 1986
INVENTOR(S) : John H. Bodine

Page 1 of 6

It is certified that error appears in the above-identified patent and that said Letters Patent is hereby corrected as shown below:

In the Abstract, line 6, "fo" should read --to--.

Column 2, line 12, "7a-c" should read --7b and d--;
    line 14, "7d" should read --7c--.

Column 3, line 65, "65, 70" should read --70, 75--;
    line 67, "70" should read --75--.

Column 7, line 13, "v" should read --$\bar{v}$--.

Column 9, line 1, delete "form".

In the Drawings: Attached are Figures 9, 10, 11, 12 and 13 which were not included in the original printing of the patent.

Signed and Sealed this

Twentieth Day of June, 1989

Attest:

DONALD J. QUIGG

Attesting Officer

Commissioner of Patents and Trademarks